United States Patent Office 3,075,842
Patented Jan. 29, 1963

3,075,842
METHOD OF PREPARING CANNED CHEESE
Jack F. Shaver, Menlo Park, Calif., assignor to Gerber Products Company, Fremont, Mich., a corporation of Michigan
No Drawing. Filed Nov. 28, 1958, Ser. No. 776,728
7 Claims. (Cl. 99—116)

This invention relates to a new sterile canned cheese product and method of preparing the same.

More particularly, the invention relates to canned cottage cheese either alone or mixed with flavoring materials, such as fruits, and the method for producing such a product.

A principal object of this invention is to provide a comparatively simple method of preparing a canned cottage cheese product either with or without flavoring, such as fruits, and which has a storage shelf life beyond that of products of a similar type or nature as heretofore known.

The liquid and solid components of cottage cheese tend to separate during shelf life, particularly after sterilization in a can or other container. The casein protein content of the cheese tends to coagulate and shrink, while the serums and solubles and some of the protein materials tend to form liquids which separate from the casein. It is an object of this invention to prevent such syneresis.

In past procedures aimed at successfully canning cheese, salts have been added for stabilization purposes. The salts, not being particularly flavorful, were masked by the inclusion of sugars and materials having very high fat value. Thus the products were not acceptable from a flavor standpoint and were objectionable because of high fat content.

A principal object of this invention is to provide a palatable cheese product packed in a can or glass which is sterile and stable. The flavor, texture and color are all excellent and the product of the present invention has a very useful market as a prepared food for infants.

Other objects and advantages of the present invention will become apparent upon reference to the accompanying specification.

Preferably for infants' diets, a cheese having a soft curd, such as cottage cheese, and which is low in solid content is employed. Any creamed or uncreamed, salted or unsalted, cottage cheese may be used in this invention whether frozen or fresh. Any combination of rennin and lactic acid coagulated cottage cheese is usable and the curd may be large or small or the cottage cheese may be in homogenized form as a starting material. The pH of commercial cheese suitable for use in this invention may be in the range from about 4.2 to 5.6.

The processes are available for the production of the cheese of this invention. One may be expressed as the batch process while the other may be expressed as the line process. The preferred process is the line process and it will be described first.

It has been learned that the texture of the end product is smoother to the tongue and of better texture when the product is produced through the so-called line process than when using the batch process though both products are commercially acceptable and each has certain advantages in respect to different formulations.

The essence of the line process is to mill or grind fresh or frozen cottage cheese so that it will pass through a .031 screen and then mix the same with water and other ingredients, including, for example, flavored materials such as fruit, sugar, whole milk solids, thickening agents. In practice after the slurry is formed, the pH is adjusted to between 4.35 and 4.55. The pH may vary upwardly or downwardly, in accordance with the final formulation desired. The slurry is then homogenized at a pressure of from 500 to 4,000 p.s.i.

Thereafter the aqueous slurry is conveyed to a heating chamber such as that described in U.S. Patent Nos. 2,492,635 or 2,801,087, where the product is heated to a temperature of from about 245° F. to 270° F. In order to insure sterility of the product the so-heated material is held for a period varying from about 10 seconds to a minute or so and is then conveyed to a conventional flash evaporator where it is cooled to between about 200° F. to 250° F., or thereabouts, and then filled in containers and held for a period of about three minutes to about fifteen minutes at around 190° F. to 212° F. to insure sterilization.

The holding time at the first heating stage is not of importance insofar as the characteristics of the end product are concerned. As a matter of fact the holding time could be dispensed with except for the problems of sterility and the laws pertaining thereto. If, however, irradiation or the like was employed to insure sterility of the product, then the holding time could be dispensed with and the flashing to 200° F. to 205° F. might also be changed to some other temperature of convenience.

A typical formulation for so-called line processing of the product of the present invention might involve the following:

| Ingredients: | Lbs./100 gals. (840 lbs.) |
|---|---|
| Frozen cottage cheese | 337. |
| Pineapple | 120–150. |
| Sucrose | 70. |
| Whole milk solids | 40. |
| Thickening agent | 30–45. |
| Lemon concentrate | 1.25–1.50. |
| Water | 250–350 lbs. |

The range of total solids is about 26%–29% on a dry basis.

For practical purposes the optimum heating temperature might be said to be about 260° F. and the holding time 20 seconds. An operable range may be from about 205° F. to about 280° F. Again, the holding time is reiterated as a point of practical necessity from the standpoint of meeting the sterility regulations.

A suitable thickening agent which has proved to be satisfactory is known as W-13, which is a modified waxy corn starch, manufactured by the American Maize Company under Patent No. 2,328,537. Other thickening agents may be employed that would be characterized as a thickening agent chosen from the group comprising waxy sorghum starch, tapioca, wheat starch, or wheaat flour, or perhaps gums such as locust bean gum and guar, alginates such as seaweed extracts, and Irish moss, as well as pectin, and starches generally. Any fruits may be used as pineapple.

The pH is generally modified downwardly from the normal pH of cottage cheese to the desirable range set forth by means of lemon juice or other acidifier.

The essential step for producing the desired product with the line procedure embodies the mixing of the cheese and other ingredients including the thickening agent and milling the same to a fine particle size, placing the material in an aqueous slurry, adjusting the pH, and then homogenizing the mixture to present a very finely divided particle size before subjecting to the relatively high heat treatment. From a practical standpoint it is a preferred procedure to first mill the cheese alone and then add the milled cheese to the other ingredients with water and then pass to the homogenization step after adjusting the pH. It is theorized that when the material in the finely divided state is subjected to high heat there is a denaturation of the casein protein content in the presence of a protective colloid system formed by the starch thickening agent thus tending to retain the protein particles in the desirable particle size and prevent them from agglomerating and forming large, rather than minute, discrete, particles which produce a smooth texture to the end product.

In the event a cheese product is desired which does not employ a fruit flavor or other acid containing flavoring which reduces the pH to a point below 4.55 pH, then it is necessary generally, from a standpoint of providing sterility, to subject the canned product to retort heat treatment which might take the form of 240° F. for about 50 minutes or so. In other words, when the pH of the product is above 4.55, it is generally necessary to subject the canned product to cooking temperatures after canning, while this is not so when the product is below the 4.55 pH and where the product may be hot-filled. Again from a practical standpoint the 4.55 pH is not necessarily a critical point and actually the product may be as high as 4.7 pH without deleterious effect. It has been found, however, that pH 4.55 is a good working limit.

The ingredients and proportions may vary. For example, the water content may be varied from around 25% to 40% by weight, while the cottage cheese content may be varied from around 45% to 65% by weight. The solid content could be higher if desired. The thickening agent or starch may vary between 1% and 3% by weight of the product, and the sugar may go anywhere from ½ of 1% to approximately 5% or even higher, and of course the fruit flavor may be varied according to desired tastes.

Other typical formulae may be stated as follows:

| Ingredients: | Lbs./100 gals. (840 lbs.) |
| --- | --- |
| Cottage cheese | 367. |
| Water | 133. |
| Pineapple | 128. |
| Sugar | 75. |
| Whole milk powder | 42.5. |
| W-13 | 37.5±5. |
| Orange juice concentrate | 7.5. |
| Lemon juice concentrate | To pH=4.4. |

| Ingredients: | Lbs./100 gals. (840 lbs.) |
| --- | --- |
| Cottage cheese | 367. |
| Water | 101. |
| Milled pineapple | 80. |
| Crushed pineapple | 80. |
| Sugar | 75. |
| Whole milk powder | 42.5. |
| W-13 | 37.5±5. |
| Lemon juice concentrate | To pH=4.5. |
| Orange juice concentrate | 7.5. |

| Ingredients: | Lbs./100 gals. (840 lbs.) |
| --- | --- |
| Cottage cheese | 367. |
| Peach puree | 160. |
| Water | 102. |
| Sugar | 75. |
| Whole milk powder | 42.5. |
| W-13 | 37.5±5. |
| Lemon juice concentrate | To pH=4.4. |
| Orange juice concentrate | 7.5. |

In the batch process, the cottage cheese is milled or ground, mixed, and formed into an aqueous slurry with other ingredients with which the formula is concerned, except the starch thickening agent. The slurry is then heated to about 200° F. to 210° F. and is then homogenized at pressures of from 1,500 to 4,000 p.s.i. to reduce the particle size to a very finely divided state. The slurry is then pumped to a mixing kettle where the thickening agent is added, and then the slurry is reheated to about 190° F. to 200° F. to bring to fill temperature. Thereafter the product is filled into cans or other containers and retorted at about 240° F. for about 50 minutes. The pH of the final product without adjustment of pH through use of fruits or acids such as lemon juice is about 5.35 pH, or within a range from about 5 to 6 pH. A typical formula would involve the following:

| Ingredients: | Lbs./100 gals. (840 lbs.) |
| --- | --- |
| Cottage cheese | 337. |
| Sucrose | 80. |
| Whole milk solids | 44. |
| Thickening agent | 24. |
| Cinnamon extract | .015. |
| Water | 355 lbs. |

The range of total solids is about 26%-29% on a dry basis.

Again the ingredients and proportions may vary. Cottage cheese may be 45% to 65% by weight of the total product, water 25% to 40% by weight of the total product, thickening agent 1% to 3% by weight of the total product, and the sugar and sweetening agents, fruit juices and the like are variable at the desire of the manufacturer.

Another typical example of a product made according to the batch process is as follows:

| Ingredients: | Lbs./100 gals. (840 lbs.) |
| --- | --- |
| Cottage cheese | 337. |
| Sugar | 80. |
| Whole milk powder | 44. |
| W-13 | 30±5. |
| Cinnamon extract | 0.304 oz. |
| Water | To vol. |

The temperatures may be variable both as to the first heating step and the second heating step. The first heating step should be such as to form a curd and may vary from about 126° F. to 212° F. in an open vessel. The second or reheating step after mixing of the thickening agent with the slurry can vary practically from about 185° F. to 212° F. The holding times for both steps is unimportant so long as the product reaches a temperature within the ranges set forth.

The product produced by either the batch or the line process has outstanding keeping characteristics and allows the inclusion of flavoring agents such as fruit juices which produces a completely new product heretofore unknown on the American scene.

General ranges of composition of formulations as to fat, protein and carbohydrate may be stated as follows:

| | Percent |
| --- | --- |
| Fat | 0 to 10 |
| Protein | 5 to 15 |
| Carbohydrate | 1 to 15 |

The word "canned" or "canning" as used herein means any method of packaging employing cans, jars, tubes or the like made of metal, glass, plastic or like materials. "Sterile" means food packaged, as by canning, in a non-toxic, bacterial-free condition which is usable for human consumption after storage for protracted periods without deterioration.

The procedures and formulae set forth herein are exemplary and are subject to change and modification within the spirit of the invention and the scope of the claims.

What is claimed is:

1. A process of preparing a sterile canned cottage cheese product which comprises the steps of forming an aqueous slurry of cottage cheese and a thickening agent chosen from the group consisting of starches, tapioca, gums, alginates, and pectin, adjusting the pH to between about 4.35 nad 4.55, then homogenizing the slurry and then heating the slurry to a temperature of about 245° F. to 270° F., then cooling the slurry, and canning the same, said heating and cooling steps being conducted over a period of time sufficient to insure sterilization.

2. A method of preparing a sterile canned cottage cheese product comprising forming an aqueous slurry of cottage cheese and water, wherein the cottage cheese is present in the proportion of about 40% to 65% by weight, then adding a starch thickening agent in the proportion of about 1% to 3% by weight, then adjusting the pH of the slurry to below about 4.7, then heating the slurry to a temperature of about 205° F. to 280° F., and then cooling the slurry and canning the same, said heating and cooling steps being conducted over a period of time sufficient to insure sterilization.

3. A process in accordance with claim 1 wherein the pH is adjusted by the addition of fruit to the slurry.

4. A process of preparing a sterile canned cottage cheese product which comprises the steps of forming an aqueous slurry of cottage cheese and a thickening agent chosen from the group consisting of starches, tapioca, gums, alginates, and pectin, adjusting the pH to between about 4.35 and 4.55, then homogenizing the slurry and then heating the slurry to a temperature of about 245° F. to 270° F. for about 10 seconds to 1 minute, then gradually cooling the slurry at a rate sufficient to insure sterilization by retained heat and canning the same.

5. A process of preparing a canned cheese product which comprises forming an aqueous slurry of cottage cheese in water, heating the slurry to a temperature of between 126° F. to 212° F. to produce curds, then homogenizing the slurry, then adding a starch thickening agent, then reheating the slurry to about 185° F. to 212° F., and canning and retorting the product at about 240° F. for about 50 minutes to preserve the same.

6. A process of preparing a sterile canned cottage cheese product which comprises the steps of forming an aqueous slurry of cottage cheese and a thickening agent chosen from the group consisting of starches, tapioca, gums, alginates, and pectin, adjusting the pH to less than about 4.7, then homogenizing the slurry, and then heating the slurry to a temperature of about 245° F. to 270° F. for about 10 seconds to 1 minute, then gradually cooling the slurry at a rate sufficient to insure sterilization thereof by retained heat and canning the same.

7. A process of preparing a canned cheese product which comprisse forming an aqueous slurry of cottage cheese and water, heating the slurry to produce cheese curds, then homogenizing the slurry, then adding a starch thickening agent, and then reheating the slurry, and canning and retorting the product at a temperature of about 240° F. for about 50 minutes.

References Cited in the file of this patent

UNITED STATES PATENTS

| | | |
|---|---|---|
| 2,098,764 | Sharpless | Nov. 9, 1937 |
| 2,160,159 | Lundstedt et al. | May 30, 1939 |
| 2,161,401 | Doering et al. | June 6, 1939 |
| 2,812,258 | Wright | Nov. 5, 1957 |
| 2,850,390 | Irvine et al. | Sept. 2, 1958 |
| 2,871,127 | Barch et al. | Jan. 27, 1959 |